Aug. 26, 1969   WEI TEH CHOW   3,463,029
OMNIDIRECTIONAL POWER TRANSMISSION DEVICE
Filed March 6, 1968                              2 Sheets-Sheet 1

INVENTOR.
Wei Teh Chow

INVENTOR.

Wei Teh Chow

United States Patent Office 3,463,029
Patented Aug. 26, 1969

3,463,029
OMNIDIRECTIONAL POWER TRANSMISSION
DEVICE
Wei Teh Chow, 605 Water St., New York, N.Y. 10002
Filed Mar. 6, 1968, Ser. No. 710,814
Int. Cl. F16h 3/14, 1/12
U.S. Cl. 74—385         6 Claims

ABSTRACT OF THE DISCLOSURE

A power transmission device for transmitting power between an input and an output shaft whose axes can be originally positioned in any three-dimensional orientations relative to each other. Each shaft is supported by a different housing and two additional housings are inserted between them. Three shafts extend through the housings to couple the first two shafts. All housings are adjustably rotatable relative to one of the housings and rotation of the housings also rotates the input and output shafts and one other shaft because the shafts are coupled to one another by means of gearings which allow a full 360 degree relative rotation of the axes of their associated shafts.

---

This invention relates to the transmission of power between two shafts and especially to means permitting the transmission of power between two shafts which may be oriented in any directions relative to each other.

In the transmission of power between two shafts, devices exist for coupling shafts which are in line, parallel, or orthogonal to each other. However, it is often necessary to place the prime mover and driven mechanism in such locations that the shafts are not oriented and it would then be very useful to have a device which could transmit power between shafts oriented in any direction relative to each other.

Designers in this field are faced with two troublesome problems, namely, how to bring power efficiently to the place where it is needed and how to align the power transmission components perfectly. In some applications, the relative orientation of the points between which rotary power is to be transmitted precludes the use of rigid shafts.

When the union of two shafts is required, the shafts must have good initial alignment and stable support bearings to insure satisfactory performance. However, perfect alignment is almost impossible to attain due to installation tolerances, wearing of parts, thermal expansion during operation, deflection of supporting structures due to shock loads, etc. The resulting misalignment can cause worn or failed bearings, fatigued shafts and broken couplings.

Designers sometimes solve these problems by using flexible shafts but these in general can provide only limited torque capacity and in some cases permit power transmission in one direction only. Restrictions on the use of flexible shafting include its limitation to angular displacements of no more than 5 degrees and offsets of no more than about 1/16 of an inch between the shafts.

Universal joints will tolerate up to 45 degrees in angular displacement between shafts but, unless used in pairs, will give nonuniform angular-velocity output.

Accordingly, an object of this invention is to enable power to be transmitted between two shafts oriented in any direction relative to each other.

A further object is to provide a device for mechanically transmitting power between misaligned shafts, the device being unlimitedly adjustable in three-dimensional space so that it is capable of adjusting for any amount of misalignment.

The objects and advantages of the present invention are accomplished by a gearing device which is formed in successive sections, each section being located in a housing which is rotatable relative to its adjacent housing. Rotation of the shaft sections within each housing is accomplished by gears which permit one shaft to rotate a full 360 degrees around the other shaft.

Other objects and many of the attendant advantages of this invention will be readily appreciated as the same becomes better understood by reference to the following detailed description when considered in connection with the accompanying drawings in which.

Figure 1:
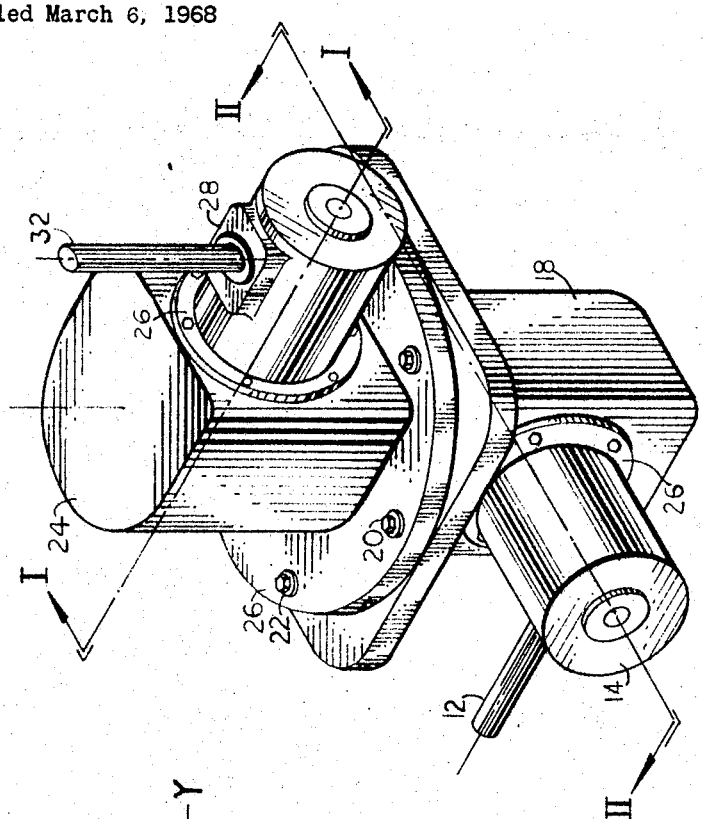
FIG. 1 is a perspective view of an embodiment of the invention.

One embodiment of the omnidirectional power transmission device is shown in perspective view in FIG. 1. Here a shaft 12, is supported by a first housing, or shaft-support means, 14. As is customary, such a rotatable shaft is supported by a bearing 56 which is, in turn, supported by the wall of the housing. The details of support are conventional. The shaft 12 may be called the driving shaft because, in practice, it would be coupled to the shaft of a prime mover such as a gasoline motor.

The first, or driving-shaft, housing 14 is formed with, or affixed to, a circular, flange-like base 16, forming a single unit therewith. The circular base 16 is in slidable contact with one wall of a second housing 18, which can be called the reference housing.

Figure 2B:
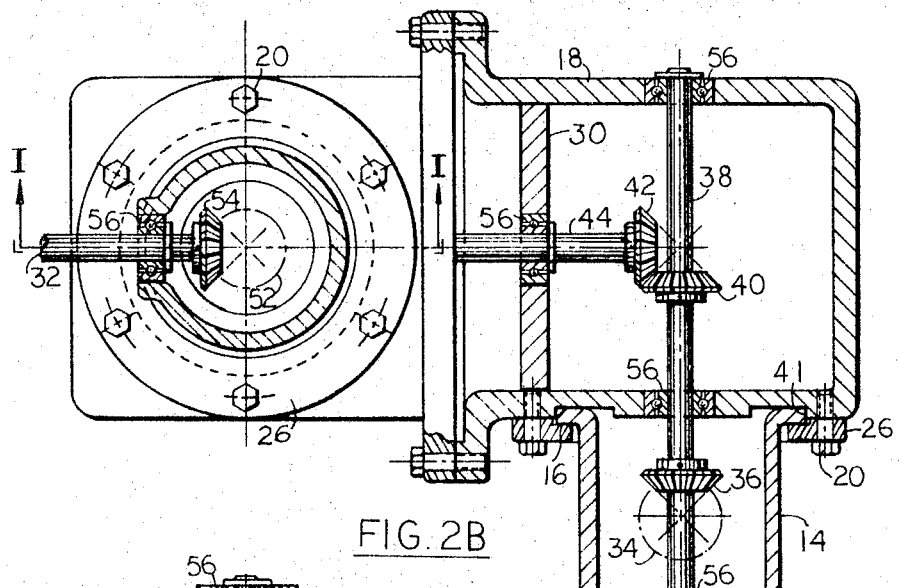
FIG. 2B is a partial cross-sectional view of the device, the section being taken along line II—II of FIG. 1, the orientation shown being that of FIG. 2A after housing 28 has been rotated forward by 90 degrees.
Figure 2A:
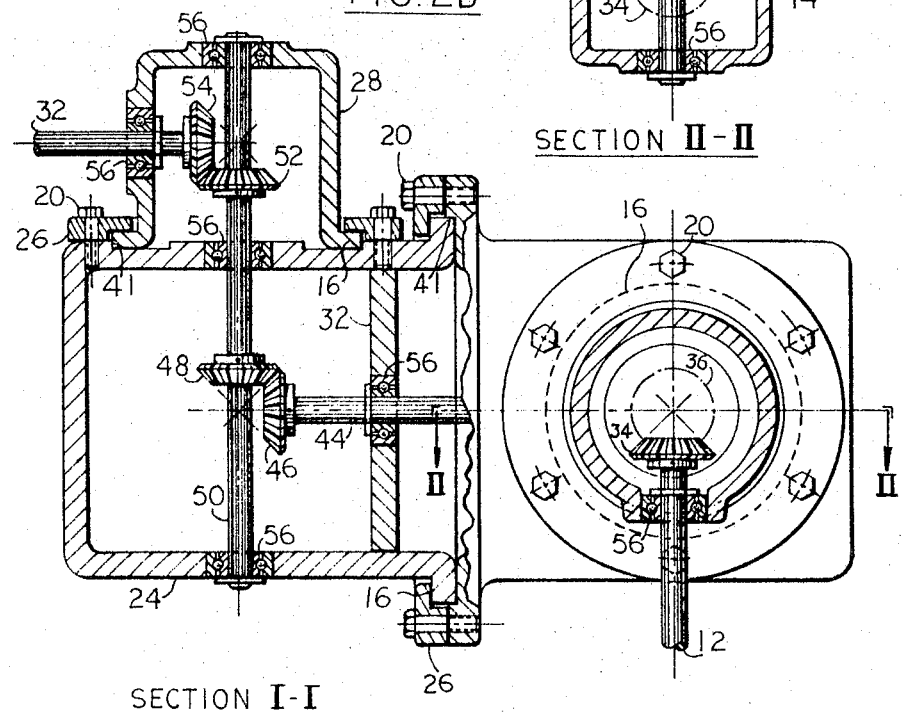
FIG. 2A is a partial cross-sectional view of the device, the section being taken along line I—I after the device has been rotated so that the driven shaft 32 is horizontal and at the left side.

It can be seen from FIGS. 2A and 2B that the housing walls are built, preferably, with circular guidance recesses 41 in which the circular bases of the adjacent housings are seated and can be rotated. This prevents misalignment of the bevel gears when housing orientations are adjusted. Three of the housings, 14, 24 and 28, are constructed with these circular, flange-like bases which fit into guidance recesses.

The first housing 14 can be made immovable with respect to the reference housing 18 by tightening down a clamping ring 26 by means of screws or nuts 20 and washers 22. Other types of clamping devices can, of course, be employed.

A third housing 24 sits on a circular base 16 on the top wall of the reference housing 18 and is also rotatable relative to the latter.

A fourth housing 28 sits on a circular base 16 on a side wall of the third housing 24 and is thus rotatable relative to the latter. The fourth housing 28 supports the shaft 32, designated the driven shaft because, in practice, it would be coupled to the shaft of a driven machine such as an electric generator.

It can be seen from FIGS. 2A and 2B that the driving shaft 12 has a bevel gear 34 at one end which meshes with another bevel gear 36 affixed to the first shaft 38 whose axis runs at right angles to the axis of the driving shaft 12. On shaft 38 within the reference housing 18 is a third bevel gear 40 meshing with a fourth bevel gear 42 affixed to one end of the second shaft 44. The axes of shafts 44 and 38 are orthogonal and are in a fixed orientation with respect to each other. Shaft 44 is rotatably supported by an inner transverse wall 30 of the reference housing 18 and by an inner transverse wall 32 of the third housing 24.

The opposite end of second shaft 44 ends in a fifth bevel gear 46 which intermeshes with a sixth bevel gear 48 affixed to third shaft 50 within the third housing 24. The axes of shafts 44 and 50 are perpendicular to each other. Shaft 50 also supports a seventh bevel gear 52 which meshes with an eighth bevel gear 54 affixed to one end of the driven shaft 32.

The gear ratio of the various sets of bevel gears is a matter of choice, a 1:1 ratio being the simplest choice.

The various shafts run through several bearings 56 which are mounted in the walls of the housings.

Figure 3:
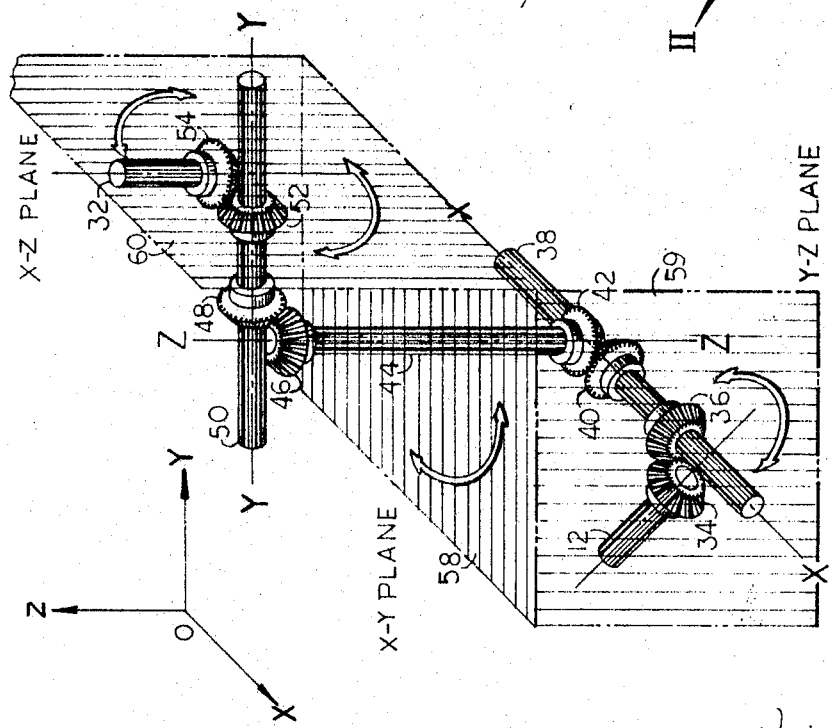
FIG. 3 is a diagrammatic illustration of the principle of operation of the invention in relation to a set of three Cartesian coordinate axes.

The theory of the invention is illustrated in FIG. 3. The first and second shafts 38 and 44 are fixed in position at right angles to each other and therefore may be considered to be reference shafts. The axis of the first shaft 38 can be taken as the X-axis and that of the second shaft 44 as the Z-axis of a Cartesian-coordinate system, the intersection of the two axes being the zero point of the coordinate system, as shown. The zero point lies inside the reference housing 18.

Rotation of the first housing 14 with respect to the reference housing 18 rotates the driving shaft 12 in the YZ-plane 59 since the bevel gear 34 can rotate around bevel gear 36. A full 360 degree rotation can be made.

Rotation of the third housing 24 relative to the reference housing 18 rotates the third shaft 50 and the driven shaft 32 in the XY-plane 58 since bevel gear 48 can rotate around bevel gear 46. Again, a full 360 degree rotation is possible.

Rotation of the fourth housing 28 relative to the third housing 24 rotates the driven shaft 32 in the XZ-plane 60 since the bevel gear 54 can rotate around bevel gear 52. A full 360 degree rotation is possible.

Thus, it is evident that the driving shaft can be placed in any three-dimensional orientation relative to the driven shaft. It should also be noted that, although in most applications the driving and driven shafts would be connected to a prime-mover and a driven-machine shaft, respectively, by couplings, the device could be made for a fixed installation in which the prime-mover shaft itself would be inserted into the first housing to constitute the driving shaft of the device and the driven-machine shaft would be inserted into the fourth housing to constitute the driven shaft of the device.

Of course any other type of gearing can be used in which one gear can rotate with respect to its associated gear so that the axes of their associated shafts can be rotated 360 degrees with respect to each other. For example, a worm and wormwheel may also be employed.

It should be apparent that the third housing 24 can be made the reference housing instead of the second housing 18 and that all housings can then be made to rotate with respect to the third housing 24. This is an obvious change and the two embodiments can be considered to be equivalents.

The present invention can be built into a power transmission system as an original integral component or made as a separate component and used as an on-line adjuster during operation. It is equally effective in horizontal or vertical mounting and has very little power loss when bevel gears are used.

Obviously, many modifications and variations of the present invention are possible in the light of the above teachings.

I claim:

1. A device for transferring power between a driving and a driven shaft, said shafts being adjustably orinetable in any direction relative to each other, comprising in combination:

driving, first, second, third and driven shafts;
first, second, third and fourth support means for rotatably supporting said shafts, said first support means being adjacent to and adjustably rotatable a full 360 degrees relative to said second support means, said third support means being adjacent to and adjustably rotatable a full 360 degrees relative to said second support means, and said fourth support means being adjacent to and adjustably rotatable a full 360 degrees relative to said third support means, said first shaft extending between said first and second support means, said second shaft extending between said second and third support means, and said third shaft extending between said third and fourth support means, said first and second shafts being supported so that their axes are perpendicular to each other, the first-shaft axis forming the X-axis and the second-shaft axis forming the Z-axis of a three-dimensional, Cartesian coordinate system, said driving shaft being supported by said first support means so that its axis is perpendicular to the axis of said first shaft and said driven shaft being supported by said fourth support means so that its axis is perpendicular to the axis of said third shaft;

first gearing means connected to said first and second shafts for coupling said second shaft for rotation by said first shaft;

second gearing means connected to said second and third shafts for coupling said third shaft for rotation by said second shaft, said gearing means being of the type which permits the axis of said third shaft to be moved a full 360 degrees in the XY-plane around the axis of said second shaft;

third gearing means connected to said driving shaft and said first shaft for coupling said first shaft for rotation by said driving shaft, said gearing means being of the type which permits the axis of said driving shaft to be moved a full 360 degrees in the YZ-plane around the axis of said first shaft; and fourth gearing means connected to said driven shaft and said third shaft for coupling said driven shaft for rotation by said third shaft, said gearing means being of the type which permits the axis of said driven shaft to be moved a full 360 degrees in the XZ-plane around the axis of said third shaft so that power which is applied to said driving shaft can be transmitted by the device to drive said driven shaft regardless of the relative orientations of the two shafts in three-dimensional space.

2. A device as set forth in claim 1, wherein said support means comprise housings.

3. A device for transmitting power between the shaft of a prime mover and the shaft of a driven machine regardless of the relative orientations of said shafts in three-dimensional space comprising, in combination:

first, second and third shafts;
first, second, third and fourth support means for rotatably supporting said shafts, said first support means being adjacent to and adjustably rotatable a full 360 degrees relative to said second support means, said third support means being adjacent to and adjustably rotatable a full 360 degrees relative to said second support means, and said fourth support means being adjacent to and adjustably rotatable a full 360 degrees relative to said third support means, said first shaft extending between said first and second support means, said second shaft extending between said second and third support means, and said third shaft extending between said third and fourth support means, said first and second shafts being supported so that their axes are perpendicular to each other, the first-shaft axis forming the X-axis and the second-shaft axis forming the Z-axis of a three-dimensional, Cartesian coordinate system, said first support means rotatably supporting said prime-mover shaft so that its axis is perpendicular to the axis of said first shaft, and said fourth support means rotatably supporting said driven-machine shaft so that its axis is perpendicular to the axis of said third shaft;

first gearing means connected to said first and second shafts for coupling said second shaft for rotation by said first shaft;

second gearing means connected to said second and third shafts for coupling said third shaft for rotation by said second shaft, said gearing means being of the type which permits the axis of said third shaft to be moved a full 360 degrees in the XY-plane around the axis of said second shaft;

third gearing means connected to said prime-mover shaft and said first shaft for coupling said first shaft for rotation by said prime-mover shaft, said gearing means being of the type which permits the axis of said prime-mover shaft to be moved a full 360 degrees in the XZ-plane around the axis of said third shaft.

4. A device as set forth in claim 3, wherein said support means comprise housings.

5. A power transmission device permitting the transmission of power between two shafts which are adjustably orientable in any direction relative to each other comprising, in combination:

a pair of main housings and a main shaft, said shaft being supported for axial rotation in at least one said housing, said housings being rotatable relative to each other about the axis of said shaft;

a pair of secondary shafts journalled each in a different one of said main housings and perpendicular to and axially intersecting said main shaft;

a pair of secondary housings, each being supported for rotation relative to said main housings about the axis of its associated secondary shaft, each said secondary shaft extending out of said main housings, and into a different one of said secondary housings, said secondary shafts being journalled in their respective secondary housings;

a pair of extending shafts, one in each of said secondary housings and rotatably supported thereby, each said extending shaft intersecting and perpendicular to the secondary shaft associated with its respective housing, and each extending outside its associated housing; and torque-coupling means connecting said main shaft and said secondary shafts and connecting said secondary shafts with their respective extending shafts.

6. A device as set forth in claim 5, wherein said torque-coupling means are of a type comprising two main components which are rotatable a full 360 degrees relative to each other.

References Cited

UNITED STATES PATENTS

| | | | |
|---|---|---|---|
| 2,715,843 | 8/1955 | Clarke | 74—385 X |
| 2,764,899 | 10/1956 | West | 74—385 |
| 2,910,882 | 11/1959 | Wellauer | 74—385 X |
| 3,192,789 | 7/1965 | Savage | 74—385 |

LEONARD H. GERIN, Primary Examiner

U.S. Cl. X.R.

74—417, 606